(12) United States Patent
Tung et al.

(10) Patent No.: US 11,506,549 B2
(45) Date of Patent: Nov. 22, 2022

(54) FORCE SENSOR

(71) Applicant: Coretronic MEMS Corporation, Hsinchu County (TW)

(72) Inventors: Hsi-Wen Tung, Taipei (TW); Wen-Pin Tsai, New Taipei (TW); Ming-Ching Wu, Taoyuan (TW)

(73) Assignee: Coretronic MEMS Corporation, Miaoli County (TW)

( * ) Notice: Subject to any disclaimer, the term of this patent is extended or adjusted under 35 U.S.C. 154(b) by 88 days.

(21) Appl. No.: 16/352,835

(22) Filed: Mar. 14, 2019

(65) Prior Publication Data
US 2020/0240862 A1 Jul. 30, 2020

(30) Foreign Application Priority Data

Jan. 24, 2019 (TW) ................................. 108102625

(51) Int. Cl.
*G01L 1/26* (2006.01)
(52) U.S. Cl.
CPC ...................................... *G01L 1/26* (2013.01)
(58) Field of Classification Search
CPC ....................................................... G01L 1/26
USPC ...................... 73/862.382, 774, 866.5, 866.1
See application file for complete search history.

(56) References Cited

U.S. PATENT DOCUMENTS

| 6,441,503 | B1 * | 8/2002 | Webster .............. G01L 19/0645 257/417 |
| 7,078,796 | B2 | 7/2006 | Dunn et al. |
| 8,806,964 | B2 | 8/2014 | Thanigachalam et al. |
| 2006/0137458 | A1 * | 6/2006 | Uchida ................ G01L 19/0627 73/715 |
| 2006/0262088 | A1 | 11/2006 | Baldo et al. |
| 2009/0235754 | A1 | 9/2009 | Tseng et al. |
| 2010/0199777 | A1 * | 8/2010 | Hooper ............... G01L 19/0084 73/721 |
| 2014/0007705 | A1 | 1/2014 | Campbell et al. |
| 2016/0084722 | A1 * | 3/2016 | Hooper ................. G01L 13/025 73/721 |
| 2017/0234744 | A1 | 8/2017 | Tung et al. |

(Continued)

FOREIGN PATENT DOCUMENTS

| CN | 101139079 | 3/2008 |
| CN | 101850942 | 10/2010 |

(Continued)

OTHER PUBLICATIONS

"Office Action of Taiwan Counterpart Application," dated Aug. 22, 2019, p. 1-p. 7.

(Continued)

*Primary Examiner* — Nimeshkumar D Patel
*Assistant Examiner* — Jean F Morello
(74) *Attorney, Agent, or Firm* — JCIPRNET

(57) ABSTRACT

A force sensor includes a circuit board, a sensing element, and a first gel. The sensing element is disposed on the circuit board, wherein the sensing element has a top surface and a bottom surface opposite to each other and has a sensing portion. The bottom surface faces the circuit board. The sensing portion is located at the top surface. The first gel is disposed on the top surface and covers the sensing portion, wherein the sensing portion is adapted to generate a sensing signal through an external force transferred from the first gel to the top surface.

5 Claims, 2 Drawing Sheets

(56) References Cited

U.S. PATENT DOCUMENTS

| | | | | |
|---|---|---|---|---|
| 2017/0362077 A1* | 12/2017 | Bai | .................... | G01L 19/0076 |
| 2018/0306660 A1* | 10/2018 | Wade | .................. | G01L 19/0654 |
| 2018/0313709 A1* | 11/2018 | Chiou | ................... | G01L 19/141 |

FOREIGN PATENT DOCUMENTS

| | | |
|---|---:|---:|
| CN | 1864054 | 8/2012 |
| CN | 103674399 | 3/2014 |
| CN | 205442633 | 8/2016 |
| CN | 108344530 | 7/2018 |
| CN | 207798300 | 8/2018 |
| CN | 207894549 | 9/2018 |
| CN | 108689382 | 10/2018 |
| CN | 208187616 | 12/2018 |
| CN | 208239012 | 12/2018 |
| DE | 10236812 | 2/2004 |
| WO | 03057618 | 7/2003 |
| WO | 2011156330 | 12/2011 |

OTHER PUBLICATIONS

"Office Action of China Counterpart Application", dated Apr. 21, 2021, p. 1-p. 7.

* cited by examiner

FORCE SENSOR

CROSS-REFERENCE TO RELATED APPLICATION

This application claims the priority benefit of Taiwan application serial no. 108102625, filed on Jan. 24, 2019. The entirety of the above-mentioned patent application is hereby incorporated by reference herein and made a part of this specification.

BACKGROUND OF THE INVENTION

Field of the Invention

The disclosure relates to a sensor, and particularly, to a force sensor.

Description of Related Art

Micro-Electro-Mechanical System (MEMS) technology is a design based on a miniaturized electromechanical integrated structure. The commonly used MEMS technology is mainly used in three fields: micro sensors, micro actuators, and micro structures, where the micro sensors may convert external environmental changes (such as changes of a force, a pressure, a sound, a speed, etc.) into electrical signals (such as voltages or currents) to achieve environmental sensing functions, such as force sensing, pressure sensing, sound sensing, acceleration sensing, etc. Since the micro sensors may be manufactured by using a semiconductor process technology and integrated with integrated circuits, the micro sensors have better competitiveness. Therefore, the MEMS sensors and the sensing devices using the MEMS sensors are a development trend of the MEMS.

Taking a MEMS force sensor as an example, the sensing element therein is used to sense a pressing force applied by a physical object. If the sensing element is exposed and is directly subjected to the pressing force, the sensing element may be easily worn out due to insufficient support. However, if a cover is added to cover the sensing element and increase support in order to solve the above problem, the manufacturing cost of the sensor will be increased. Therefore, how to protect the sensing element of the force sensor and maintain its sensing performance without increasing the manufacturing cost of the sensor is an important issue in the field of MEMS force sensing.

SUMMARY OF THE INVENTION

The invention provides a force sensor capable of protecting a sensing element in a force sensor while providing the force sensor with support.

A force sensor of the invention includes a circuit board, a sensing element, and a first gel. The sensing element is disposed on the circuit board. The sensing element has a top surface and a bottom surface opposite to each other and has a sensing portion. The bottom surface faces the circuit board. The sensing portion is located at the top surface. The first gel is disposed on the top surface and covers the sensing portion. The sensing portion is adapted to generate a sensing signal through an external force transferred from the first gel to the top surface.

In an embodiment of the invention, the force sensor further includes a second gel. The second gel surrounds the first gel and covers the sensing element and the circuit board.

In an embodiment of the invention, the second gel has an opening. The opening is aligned with the sensing portion. The first gel is at least partially located in the opening.

In an embodiment of the invention, the first gel protrudes from the second gel.

In an embodiment of the invention, a material of the first gel is different from a material of the second gel.

In an embodiment of the invention, the force sensor further includes at least one bonding wire. The at least one bonding wire is connected between the top surface of the sensing element and the circuit board.

In an embodiment of the invention, the at least one bonding wire is located outside the first gel.

In an embodiment of the invention, the force sensor further includes a bonding layer. The bonding layer is disposed between the circuit board and the bottom surface of the sensing element.

In an embodiment of the invention, the force sensor further includes a signal processing unit. The signal processing unit is disposed on the circuit board and is electrically connected to the sensing element via the circuit board.

In an embodiment of the invention, a width of the first gel gradually increases in a direction away from the sensing element.

Based on the above, the force sensor of the invention includes the first gel which covers the sensing portion of the sensing element and is used to protect the sensing element from being directly contacted by the external force and being worn out. Accordingly, it is not necessary to additionally provide a cover for protecting the sensing element, and it is possible to protect the sensing element of the force sensor and maintain its sensing performance without increasing the manufacturing cost.

To make the aforementioned more comprehensible, several embodiments accompanied with drawings are described in detail as follows.

DESCRIPTION OF THE EMBODIMENTS

Figure 1:
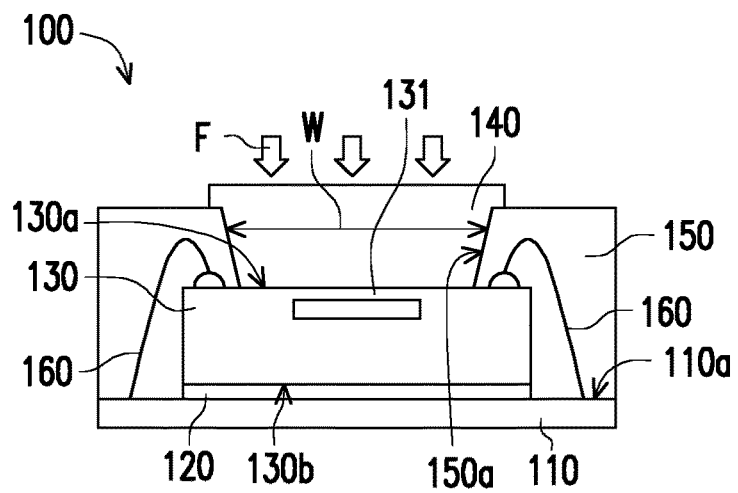
FIG. 1 is a cross-sectional view of a force sensor according to an embodiment of the invention.

FIG. 1 is a cross-sectional view of a force sensor according to an embodiment of the invention. Referring to FIG. 1, a force sensor 100 of the present embodiment is, for example, a MEMS force sensor and includes a circuit board 110, a bonding layer 120, a sensing element 130, a first gel 140, a second gel 150, and at least one bonding wire 160. The sensing element 130 has a top surface 130a and a bottom surface 130b opposite to each other and has a sensing portion 131, and the sensing portion 131 is located at the top surface 130a. The sensing element 130 may be a piezoresistive sensing element, a capacitive sensing element, or a suitable sensing element of another type, and the invention is not limited thereto.

The first gel 140 is disposed on the top surface 130a of the sensing element and covers the sensing portion 131. The sensing portion 131 is adapted to cause the sensing element 130 to generate a sensing signal through an external force F transferred from the first gel 140 to the top surface 130a. The sensing element 130 is disposed on an electrical surface 110*a* of the circuit board 110. The at least one bonding wire 160 is connected to the top surface 130*a* of the sensing element 130 and the electrical surface 110*a* of the circuit board 110 to provide electrical connection between the sensing element 130 and the circuit board 110. The circuit board 110 may be connected to other components and integrate the sensing signal generated by the sensing element 130 with the functions of other components. The force sensor 100 may be applied to a device with a touch function to determine a touch force of a user through its force sensing function. However, the invention is not limited thereto, and the force sensor 100 may also be applied to devices of other types.

Specifically, the sensing element 130 is, for example, a piezoresistive sensor, in which the material of the main body is, for example, silicon, and the sensing portion 131 thereon is provided with a piezoresistive material, and the piezoresistive material is electrically connected to the corresponding at least one bonding wire 160.

The bonding layer 120 is disposed between the electrical surface 110*a* of the circuit board 110 and the bottom surface 130*b* of the sensing element 130, and its thickness may be adjusted to change the distance between the circuit board 110 and the sensing element 130. When a force sensor of a fixed size or a different size is to be manufactured, the presence of the bonding layer 120 allows the user to make changes to the design. In the present embodiment, since the sensing element 130 and the circuit board 110 are electrically connected via the at least one bonding wire 160, the bonding layer 120 may form bonding between the circuit board 110 and the sensing element 130 through a highly adhesive material such as a thermosetting polymer (e.g., an epoxy resin) or an ultraviolet curing resin, which is not required to have electrically conductive properties.

The at least one bonding wire 160 is not covered by the first gel 140 and is located outside the first gel 140, and the at least one bonding wire 160 is covered by the second gel 150 surrounding the first gel 140. Specifically, the second gel 150 surrounds the first gel 140 and covers the sensing element 130, the circuit board 110, and the at least one bonding wire 160, such that the sensing element 130 and the bonding layer 120 are enclosed in a space formed by the first gel 140, the second gel 150, and the circuit board 110 to prevent the sensing element 130 from contact with the moisture and dust in the external environment, which reduces the sensitivity of the force sensor 100.

In some embodiments, the second gel 150 may be formed, for example, by an injection molding process through a fixed-size mold to facilitate the curing and the shape control of the second gel 150. Therefore, by changing the thickness of the bonding layer 120, the thickness of the circuit board 110 and the sensing element 130 of different sizes stacked together can be controlled within a fixed range, such that the mold used for forming the second gel 150 can be used in the sensing element 130 of different sizes to reduce the manufacturing cost. However, the forming method of the second gel 150 of the invention is not limited thereto. It is noted that the second gel 150 also covers the at least one bonding wire 160 therein so as to secure the bonding of the bonding wire 160 and prevent a loose wire. The second gel 150 may have a bevel 150*a* inclined to the top surface 130*a* of the sensing element 130 at an opening O (shown in FIG. 4) to allow the demolding process of the second gel 150 to proceed smoothly.

Due to the bevel 150*a* of the second gel 150, a width W of the first gel 140 gradually increases in a direction away from the sensing element 130. The force sensor 100 uses the first gel 140 and the second gel 150 to fully cover the sensing element 130, such that the sensing element 130 is well protected and the sensing element 130 can be prevented from being exposed and being worn out. The top portion of the first gel 140 is adapted to be subjected to a force (labeled as the external force F) to elastically deform the first gel 140, and the sensing element 130 is adapted to sense the elastic deformation of the first gel 140 to generate a sensing signal. Meanwhile, the first gel 140 protrudes from the second gel 150 and is adapted to receive the external force.

In the present embodiment, the materials of the first gel 140 and the second gel 150 are different. The hardness of the second gel 150 is, for example, greater than the hardness of the first gel 140, so that the first gel 140 is softer and has better elastic deformation ability to effectively transfer the external force to the sensing portion 131 of the sensing element 130. In addition, the second gel 150 having a greater hardness can securely cover the sensing element 130 and increase the structural strength of the force sensor 100. In the case where the hardness of the second gel 150 is sufficient, the circuit board 110 may be a rigid circuit board or a flexible circuit board, which allows more versatility in the design, but the invention is not limited thereto. In other embodiments, the material of the second gel may be the same as the material of the first gel, and the invention is not limited thereto. The first gel 140 and the second gel 150 may be formed by curing a heat curing adhesive, a photocurable adhesive, or another suitable type of adhesive material, and the invention is not limited thereto.

Figure 2:
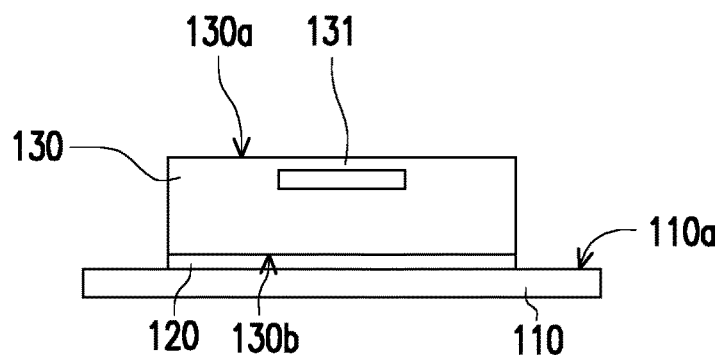
FIG. 2 to FIG. 4 are cross-sectional views showing a manufacturing process of a force sensor according to an embodiment of the invention.
Figure 3:
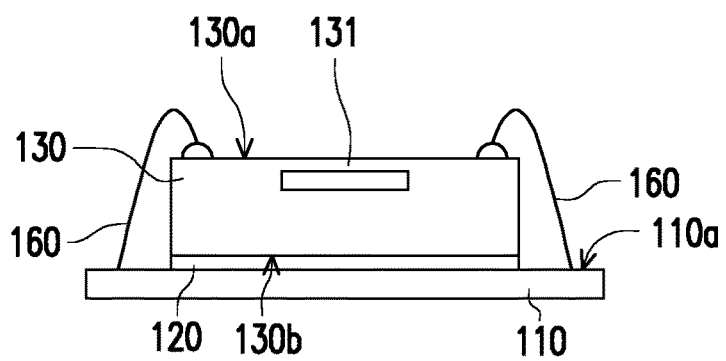
Figure 4:
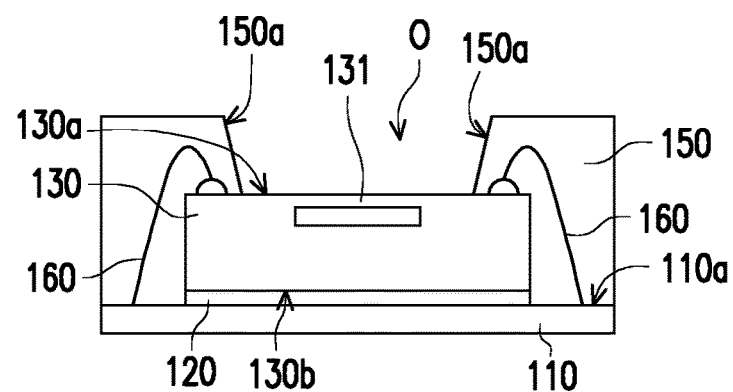

The detailed manufacturing process of the force sensor will be described below. FIG. 2 to FIG. 4 are cross-sectional views showing a manufacturing process of a force sensor according to an embodiment of the invention. The bottom surface 130*b* of the sensing element 130 and the electrical surface 110*a* of the circuit board 110 are bonded to each other through a die bonding process to form a bonding layer 120 between the sensing element 130 and the circuit board 110.

Next, referring to FIG. 3, at least one bonding wire 160 is connected through wire bonding between the sensing portion 131 of the top surface 130*a* of the sensing element 130 and the electrical surface 110*a* of the circuit board 110. However, the circuit board 110 may be a part of the electronic device.

Referring to FIG. 4, in some embodiments, to further secure the overall structure of the force sensor 100, the circuit board 110, the sides of the sensing element 130, and a portion of the top surface 130*a* are covered with the second gel 150, and an opening O is left above the sensing portion 131 of the top surface 130*a* of the sensing element 130.

Referring back to FIG. 1, the first gel 140 is then formed, for example, by dispensing or injection molding and fully fills in the opening O (e.g., FIG. 4). Through the above steps, the entire configuration of the force sensor 100 is completed.

Figure 5:
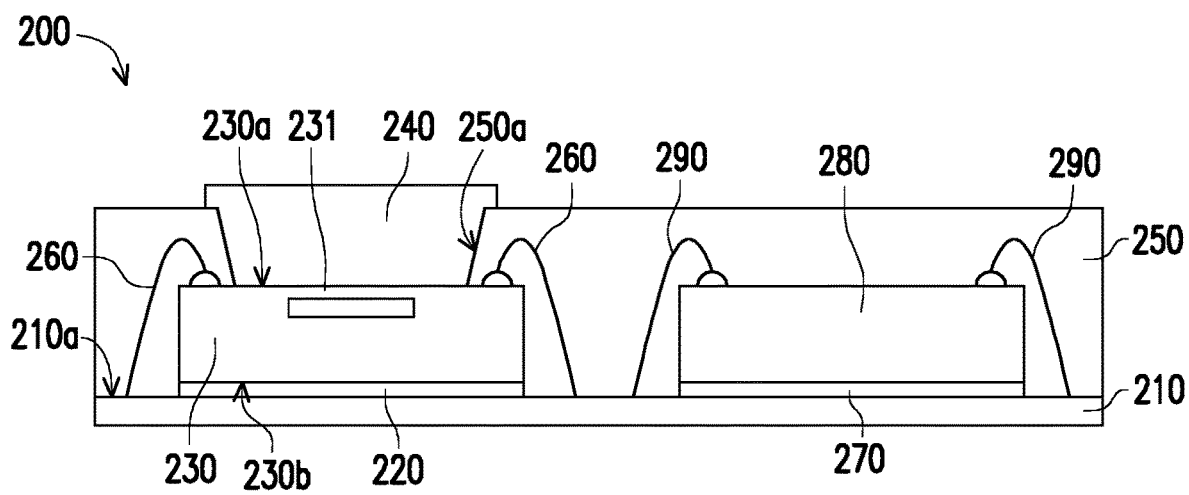
FIG. 5 is a cross-sectional view of a force sensor according to another embodiment of the invention.

FIG. 5 is a cross-sectional view of a force sensor according to another embodiment of the invention. In a force sensor 200 shown in FIG. 5, the configurations and functions of a circuit board 210, an electrical surface 210*a*, a first bonding layer 220, a sensing element 230, a top surface 230*a*, a bottom surface 230*b*, a sensing portion 231, at least one first bonding wire 260, a second gel 250, a bevel 250*a*, and a first gel 240 are similar to the configurations and functions of the circuit board 110, the electrical surface 110*a*, the bonding layer 120, the sensing element 130, the top surface 130*a*, the bottom surface 130*b*, the sensing portion 131, the at least one bonding wire 160, the second gel 150, the bevel 150a, and the first gel 140 of FIG. 1, which will not be repeatedly described herein. The difference between the force sensor 200 and the force sensor 100 lies in that the force sensor 200 further includes a signal processing unit 280. The signal processing unit 280 is similarly disposed on the electrical surface 210a of the circuit board 210 and is bonded to the electrical surface 210a of the circuit board 210 via a second bonding layer 270. The second bonding layer 270 may be configured with the same or similar material as the material of the first bonding layer 220. Moreover, the signal processing unit 280 is electrically connected to the circuit board 210 via at least one second bonding wire 290. Specifically, the second gel 250 also covers the signal processing unit 280. The sensing signal from the sensing portion 231 of the sensing element 230 can be transferred to the signal processing unit 280 via the circuit board 210 and undergo processing such as conversion or noise filtering in the signal processing unit 280.

In some embodiments, the first bonding wire 260 is not connected to the electrical surface of the circuit board 110 as the bonding wire 160 of FIG. 1 is. The first bonding wire 260 is, for example, directly connected to the signal processing unit 280 to directly transmit the sensing signal of the sensing element 230 to the signal processing unit 280 rather than transmit the sensing signal to the signal processing unit 280 via the circuit board 210, and the invention is not limited thereto.

In summary of the above, the force sensor of the invention includes the first gel and the second gel encapsulating the sensing element. While the sensing element is prevented from being directly contacted by the external force and being worn out, excellent structural support is also provided. Accordingly, it is not necessary to additionally provide a cover for protecting the sensing element, and it is possible to protect the sensing element of the force sensor and maintain its sensing performance without increasing the manufacturing cost of the force sensor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A force sensor comprising:
    a circuit board;
    a sensing element disposed on the circuit board, wherein the sensing element has a top surface and a bottom surface opposite to each other and has a sensing portion, the bottom surface faces the circuit board, and the sensing portion is located at the top surface;
    a first gel disposed on the top surface and covering the sensing portion, wherein the sensing portion is adapted to generate a sensing signal through an external force transferred from the first gel to the top surface;
    a second gel, having a upper surface and a bevel connecting to the upper surface thereof, wherein the bevel is inclined to the top surface of the sensing element at an opening, the upper surface of the second gel is substantially parallel to the top surface of the sensing element, a part of the first gel protrudes from the upper surface of the second gel, and the part of the first gel covers a part of the upper surface of the second gel; and
    at least one bonding wire, wherein the at least one bonding wire is connected between the top surface of the sensing element and the circuit board, and the at least one bonding wire is located outside the first gel,
    wherein a material of the first gel is different from a material of the second gel, the hardness of the second gel is greater than the hardness of the first gel, and the second gel surrounds the first gel and covers the sensing element, the circuit board and the at least one bonding wire.

2. The force sensor according to claim 1, wherein the second gel has an opening, the opening is aligned with the sensing portion, and the first gel is at least partially located in the opening.

3. The force sensor according to claim 1, further comprising a bonding layer, wherein the bonding layer is disposed between the circuit board and the bottom surface of the sensing element.

4. The force sensor according to claim 1, further comprising a signal processing unit, wherein the signal processing unit is disposed on the circuit board and is electrically connected to the sensing element via the circuit board.

5. The force sensor according to claim 1, wherein a width of the first gel gradually increases in a direction away from the sensing element.

* * * * *